(12) United States Patent
Kumar et al.

(10) Patent No.: US 11,689,453 B2
(45) Date of Patent: Jun. 27, 2023

(54) LAYER 2 VIRTUAL PRIVATE NETWORK TRAFFIC STEERING OVER OPTICAL TRANSPORT NETWORKS

(71) Applicant: Cisco Technology, Inc., San Jose, CA (US)

(72) Inventors: Praveen Kumar, Bengaluru (IN); Navdeep Sood, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/301,179

(22) Filed: Mar. 29, 2021

(65) Prior Publication Data

US 2022/0311704 A1   Sep. 29, 2022

(51) Int. Cl.
| | |
|---|---|
| *H04L 45/50* | (2022.01) |
| *H04L 45/00* | (2022.01) |
| *H04L 12/46* | (2006.01) |
| *H04L 101/622* | (2022.01) |

(52) U.S. Cl.
CPC ........ *H04L 45/502* (2013.01); *H04L 12/4641* (2013.01); *H04L 45/62* (2013.01); *H04L 45/66* (2013.01); *H04L 2101/622* (2022.05)

(58) Field of Classification Search
CPC ... H04L 12/4641; H04L 45/502; H04L 45/62; H04L 45/66; H04L 61/6022
USPC ......................................................... 709/238
See application file for complete search history.

(56) References Cited

U.S. PATENT DOCUMENTS

| | | | |
|---|---|---|---|
| 9,100,213 B1 * | 8/2015 | Ramanathan ....... | H04L 12/6418 |
| 11,271,849 B1 * | 3/2022 | Darwish ................ | H04L 45/22 |
| 2004/0170173 A1 | 9/2004 | Pan et al. | |
| 2005/0044262 A1 * | 2/2005 | Luo ...................... | H04L 12/4641 709/238 |
| 2006/0112431 A1 * | 5/2006 | Finn ...................... | H04L 63/104 726/22 |
| 2008/0031263 A1 * | 2/2008 | Ervin .................. | H04L 12/4641 370/397 |

(Continued)

FOREIGN PATENT DOCUMENTS

WO    2011140873 A1    11/2011

OTHER PUBLICATIONS

Kumar et al., Optical Transport Network Label Switched Path Segment Restoration, ip.com, pp. 1-18 (Apr. 2018) (Year: 2018).*

(Continued)

*Primary Examiner* — David P Zarka
(74) *Attorney, Agent, or Firm* — Patterson + Sheridan, LLP (57) ABSTRACT

Techniques for virtual private network (VPN) services over optical networks. Client data is received from a source device connected to a first node in an optical communication network. The client data is for transmission over the optical communication network to a destination device connected to a second node in the optical communication network. The client data is transmitted from the source device to the destination device using a layer 2 (L2) virtual network connection between the source device and the destination device. This includes transmitting the client data from the first node to the second node over an optical transport network (OTN) path through the optical communication network using a frame. The second node is configured to receive the frame and transmit the client data to the destination device based on an identifier in the frame.

9 Claims, 9 Drawing Sheets

(56) References Cited

U.S. PATENT DOCUMENTS

| | | | |
|---|---|---|---|
| 2011/0199894 A1 | 8/2011 | Asati et al. | |
| 2012/0287778 A1* | 11/2012 | Saitoh | H04L 41/0663 370/228 |
| 2013/0163982 A1* | 6/2013 | Tochio | H04L 12/4641 398/58 |
| 2013/0259465 A1* | 10/2013 | Blair | H04L 12/4641 370/254 |
| 2014/0201374 A1* | 7/2014 | Ashwood-Smith | G06F 9/50 709/226 |
| 2014/0314401 A1* | 10/2014 | Fujimori | H04B 10/038 398/5 |
| 2016/0088375 A1* | 3/2016 | Dahlfort | H04L 49/15 398/48 |
| 2016/0218948 A1 | 7/2016 | Djukic et al. | |
| 2016/0308757 A1 | 10/2016 | Filsfils et al. | |
| 2017/0005934 A1* | 1/2017 | Hironaka | H04L 49/50 |
| 2017/0012827 A1* | 1/2017 | Ashwood-Smith | H04L 41/40 |
| 2018/0295103 A1* | 10/2018 | Sarwar | H04L 69/22 |

OTHER PUBLICATIONS

Kumar et al., Enhanced Restoration Technique for Latency Sensitive Payloads over Generalized Multiprotocol Label Switching Optical Transport Networks, ip.com, pp. 1-11 (Nov. 2017) (Year: 2017).*

Kumar et al., Operations, Administration and Management Enhancement for Optical Transport Networks, ip.com, pp. 1-12 (Jun. 2017) (Year: 2017).*

Kumar et al., GMPLS LSP Setup and Restoration Using ODU Path Latency Criteria, Technical Disclosure Commons, pp. 1-7 (Jun. 2020) (Year: 2020).*

Kumar et al., Control Plane Shared Risk (CPSR) Factor in a Converged Packet-Optical Network, Technical Disclosure Commons, pp. 1-7 (Aug. 2020) (Year: 2020).*

L. Andersson et al., "Framework for Layer 2 Virtual Private Networks (L2VPNs)," Network Working Group, Sep. 2006, pp. 1-44.

W. Augustyn et al., "Service Requirements for Layer 2 Provider-Provisioned Virtual Private Networks," Network Working Group, Dated: Sep. 2006, pp. 1-32.

Daniel Bar-Lev, "OTN Support for Carrier Ethernet Services," MEF Wiki, Dated Jul. 31, 2017, pp. 1-2.

Larry Samberg, "Optical Transport Network (OTN)," MEF Wiki, Dated: Jul. 31, 2017, pp. 1.

\* cited by examiner

| MFAS FRAME | BIT0 | BIT1 | BIT2 | BIT3 | BIT4 | BIT5 | BIT6 | BIT7 |
|---|---|---|---|---|---|---|---|---|
| 0 | PORT_INDEX[0-7] | | | | | | | |
| 1 | PORT_INDEX[8-15] | | | | | | | |
| 2 | VLAN[0-7] | | | | | | | |
| 3 | VLAN[8-11] | | | | 0 | 0 | 0 | 0 |
| ... | FREE | | | | | | | |
| 255 | FREE | | | | | | | |

LAYER 2 VIRTUAL PRIVATE NETWORK TRAFFIC STEERING OVER OPTICAL TRANSPORT NETWORKS

TECHNICAL FIELD

Embodiments presented in this disclosure generally relate to communication networks. More specifically, embodiments disclosed herein relate to virtual private network (VPN) services over optical networks.

BACKGROUND

In a communication network a virtual private wire service (VPWS) is a VPN service that supplies a layer 2 (L2) point-to-point service. For example, VPWS provider edge (PE) devices can provide a logical interconnect such that a pair of customer edge (CE) devices appears to be connected by a single logical L2 circuit. PE devices can act as L2 circuit switches, and L2 circuits can be mapped onto tunnels in a service provider network. These tunnels can either be specific to a particular VPWS, or be shared among several services. Further, virtual private local area network (LAN) services (VPLS) can provide a virtual end-to-end service in which PE devices provide a logical interconnect such that CE devices belonging to a specific VPLS appear to be connected by a single LAN.

Ethernet private line (EPL) services can provide a private data connection that connects two or more locations for private data services. Optical networks (e.g., optical transport networks (OTN)) can provide EPL services using dedicated port to port traffic transport (e.g., over an OTN generalized multi-protocol label switching (GMPLS) network). As the edge side of OTNs become smarter (e.g., using optical-packet integration), many OTNs lack VPN service features. For example, OTNs can lack options for providing VPN services at a virtual LAN (VLAN) logical level (e.g., VPWS or VPLS).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes receiving, from a source device communicatively coupled to a first node in an optical communication network, client data for transmission over the optical communication network to a destination device communicatively coupled to a second node in the optical communication network. The method further includes transmitting the client data from the source device to the destination device using a layer 2 (L2) virtual network connection between the source device and the destination device. This includes transmitting the client data from the first node to the second node over an optical transport network (OTN) path through the optical communication network using a frame. The second node is configured to receive the frame and transmit the client data to the destination device based on an identifier in the frame.

Embodiments further include a computer program product, including a non-transitory computer-readable storage medium having computer-readable program code embodied therewith, the computer-readable program code executable by one or more computer processors to perform an operation. The operation includes receiving, from a source device communicatively coupled to a first node in an optical communication network, client data for transmission over the optical communication network to a destination device communicatively coupled to a second node in the optical communication network. The operation further includes transmitting the client data from the source device to the destination device using a layer 2 (L2) virtual network connection between the source device and the destination device. This includes transmitting the client data from the first node to the second node over an optical transport network (OTN) path through the optical communication network using a frame. The second node is configured to receive the frame and transmit the client data to the destination device based on an identifier in the frame.

Embodiments further include a system, including a processor, and a memory storing a program, which, when executed on the processor, performs an operation. The operation includes receiving, from a source device communicatively coupled to a first node in an optical communication network, client data for transmission over the optical communication network to a destination device communicatively coupled to a second node in the optical communication network. The operation further includes transmitting the client data from the source device to the destination device using a layer 2 (L2) virtual network connection between the source device and the destination device. This includes transmitting the client data from the first node to the second node over an optical transport network (OTN) path through the optical communication network using a frame.

The second node is configured to receive the frame and transmit the client data to the destination device based on an identifier in the frame

Example Embodiments

One or more techniques disclosed herein relate to implementing VPN traffic steering over an optical network (e.g., an OTN). VPWS can be implemented over OTN by, for example, appropriately labelling traffic transported over the optical network. As discussed further below with regard to FIGS. 3-4, labels (e.g., a port-index and VLAN identifier) can be added to traffic over the optical network to identify a VLAN relating to each frame. These labels can include, for example, a port-index and a VLAN identifier, and can be included in OTN overhead, as discussed below in relation to FIG. 5.

As another example, VPWS can be implemented over OTN using defined attachment circuit (AC) groups. In an embodiment, traffic can be forwarded across an OTN based on the AC group, and can be directed to the correct destination using a VLAN identifier. For example, the VLAN identifier can be unique within a given AC group. This is discussed further with regard to FIGS. 8-9, below.

As another example, VPLS can be implemented over OTN. For example, this can be done by defining bridge domains to allow node controllers to act as switches between OTN paths, and populating media access control (MAC) address tables to route traffic. This is discussed further with regard to FIGS. 6-7, below.

In an embodiment, one or more of these techniques enable L2 VLAN functionality in an OTN, without requiring multiprotocol label switching (MPLS). For example, these techniques can be used to extend OTN to support VPWS and VLAN connections. In an embodiment, VPWS can include virtual point-to-point connections, while VLAN can include multi-point connections (e.g., between more than two sites).

Figure 1:
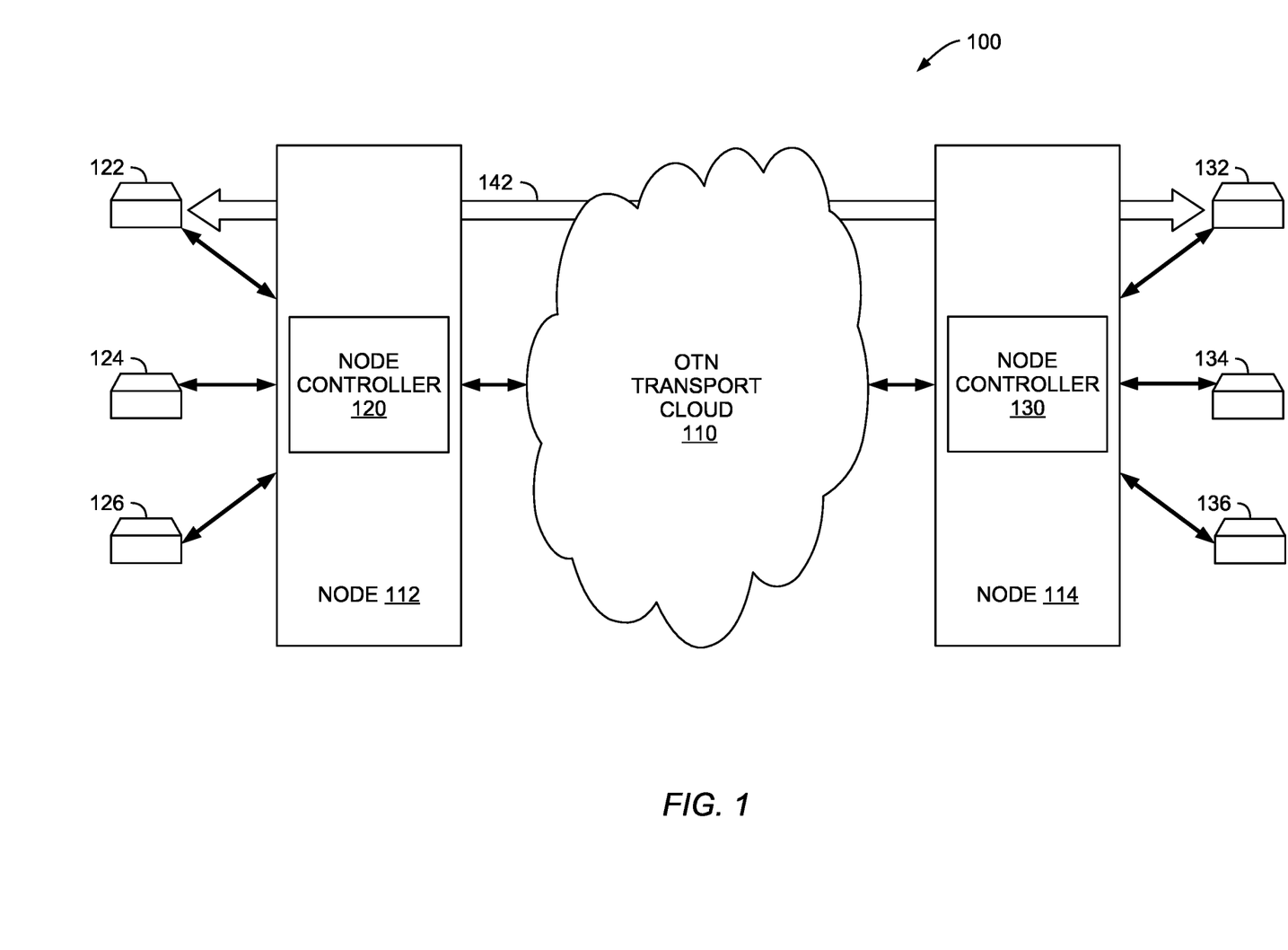
FIG. 1 illustrates VPN traffic steering in an optical network, according to one embodiment.

FIG. 1 illustrates VPN traffic steering in an optical network, according to one embodiment. A network 100 includes three CE devices 122, 124, and 126 in communication with a node 112 and a node controller 120. The node 112 communicates with another node 114 using OTN transport cloud 110. The node 114, and node controller 130, are in communication with three additional CE devices 132, 134, and 136.

For example, the node 112 can be located at one geographic location, and can communicate with the node 114 located at a different geographic location using a suitable optical network (e.g., using the OTN transport cloud 110). An OTN can use any suitable optical data unit (ODU) for communication. As one example, the OTN can use ODU-Flex for client communication (e.g., ODUFlex network-network interface (NNI) label-switched path (LSP)). This is merely one example, and any suitable client communication technique can be used.

In an embodiment, the CE device 122 communicates with the CE device 132 using a virtual connection 142. For example, the virtual connection 142 can be a VPWS connection, and the node controllers 120 and 130 can include a VPWS module configured to implement the VPWS connection. As another example, the virtual connection 142 can be a VPLS connection, and the node controllers 120 and 130 can include a VPLS module configured to implement the VPWS connection. These are discussed further with regard to FIGS. 2-9, below.

Figure 2:
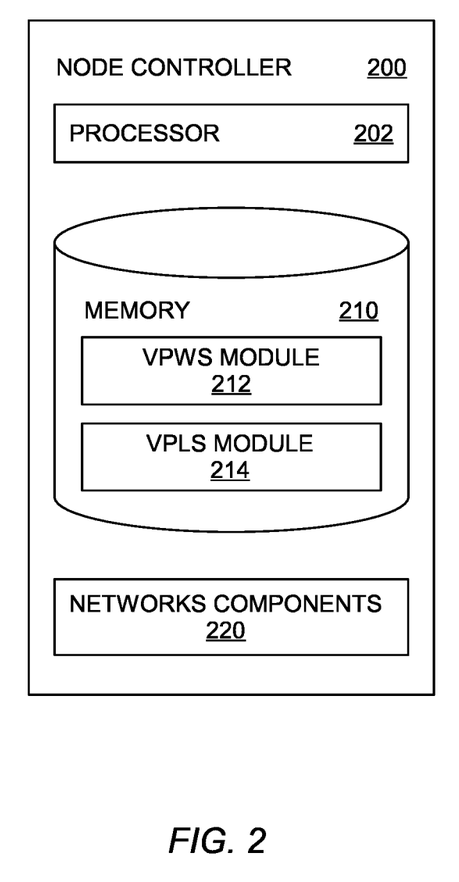
FIG. 2 is a block diagram illustrating a controller for VPN traffic steering in an optical network, according to one embodiment.

FIG. 2 is a block diagram illustrating a node controller 200 for VPN traffic steering in an optical network, according to one embodiment. The node controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the node controller 200 to interface with a wireless communication network, as discussed above in relation to FIG. 1. For example, the network components 220 can include WiFi or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the node controller 200. The program code is generally described as various functional "applications" or "modules" within the memory 210, although alternate implementations may have different functions and/or combinations of functions. Within the memory 210, the VPWS module 212 manages VPWS in an optical network, as discussed further in relation to FIGS. 3-5 and 8-9, below. The VPLS module manages VPLS in an optical network, as discussed further in relation to FIGS. 6-7, below.

Figure 3:
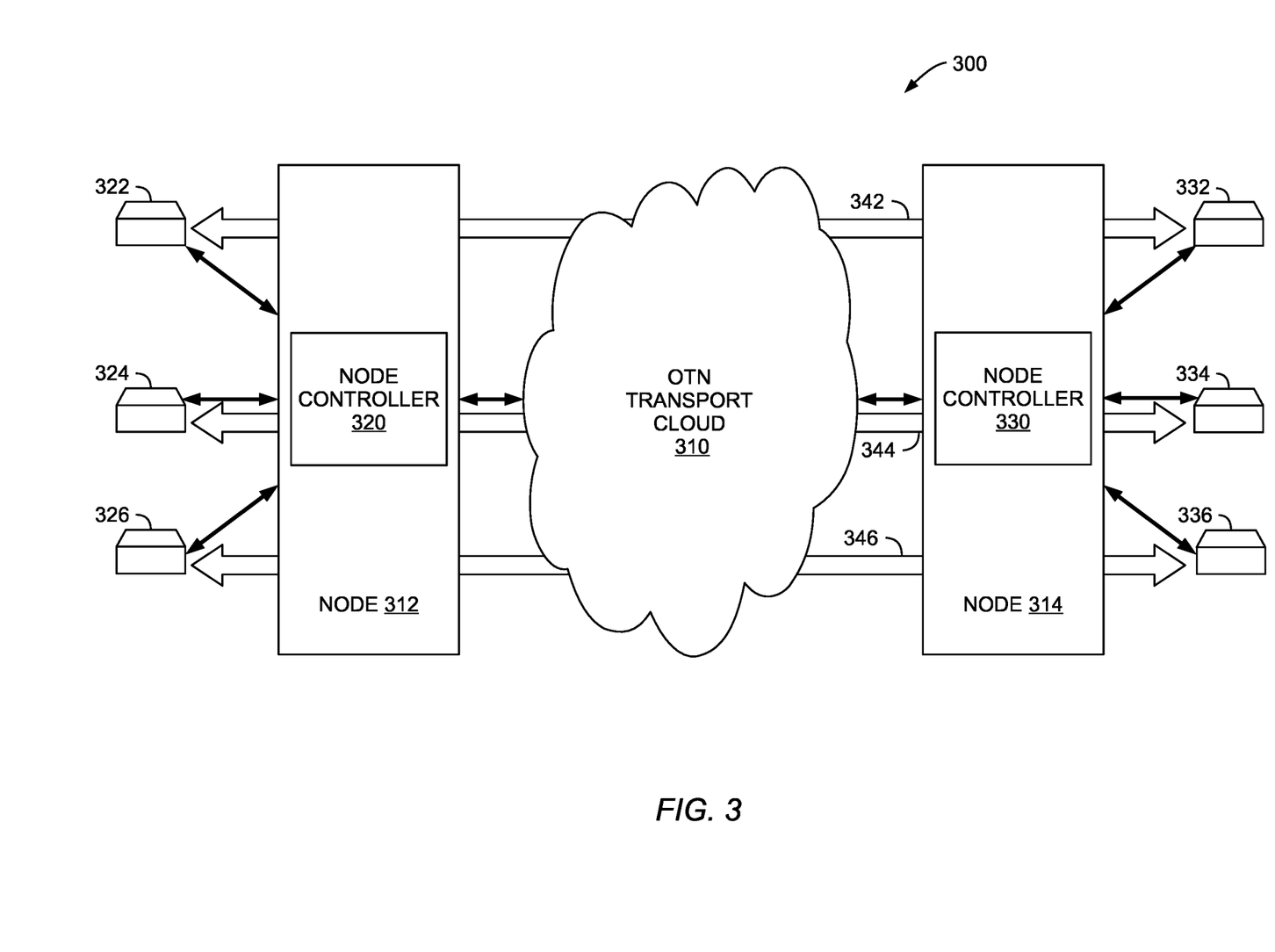
FIG. 3 is a block diagram illustrating VPWS in an optical network, according to one embodiment.

FIG. 3 is a block diagram illustrating VPWS in an optical network 300, according to one embodiment. The network 300 includes three CE devices 322, 324, and 326 in communication with a node 312 and a node controller 320. The node 312 communicates with a node 314 using OTN transport cloud 310. The node 314, and node controller 330, are in communication with three additional CE devices 332, 334, and 336. Unlike FIG. 1, FIG. 3 illustrates an optical network 300 including three VPWS connections between pairs of devices: a VPWS connection 342 between the CE devices 322 and 332, a VPWS connection 344 between the CE devices 324 and 334, and a VPWS connection 346 between the CE devices 326 and 336.

For example, the node 312 can be located at one geographic location, and can communicate with the node 314 located at a different geographic location using a suitable optical network (e.g., using the OTN transport cloud 110). In an embodiment, the node controllers 320 and 330 implement point-to-point VPWS connections between the CE devices 322, 324, and 326 and the CE devices 332, 334, and 336. For example, the node controllers 320 and 330 can implement the VPWS connection 342 between the CE devices 322 and 332, the VPWS connection 344 between the CE devices 324 and 334, and the VPWS connection 344 between the CE devices 324 and 334.

As discussed further below with regard to FIGS. 4-5, in an embodiment, the node controllers 320 and 330 implement the VPWS connections 342, 344, and 346 by including suitable identifying information for client data frames. For example, the node controllers 320 and 330 can include a port index and a VLAN identifier in transmission frames to implement the VPWS connection. The port index and VLAN identifier, together, can be used by a destination node controller to identify the correct CE device. For transmission from the node 312 to the node 314, the node controller 320 can encapsulate frames with these identifiers (e.g., using ODU overhead) and the node controller 330 can decapsulate frames and route data to the correct CE device.

For example, assume the VPWS connection 342 is associated with a VLAN identifier "100" and a port index 10,000. The CE device 322 transmits an L2 frame to the node controller 320 including this VLAN identifier (e.g., "0/1/0/0.100") and the port index. The node controller 320 encapsulates the VLAN identifier 100 and the port index into overhead for an ODU (e.g., ODUFlex OTN LSP, as discussed above) and transports the frame data and overhead data to the node controller 330 using the OTN transport cloud 310. The node controller 330 decapsulates the ODU, identifies the VLAN identifier 100 and port index, and routes the data frame to the CE device 332 based on the VLAN identifier and the port index.

Figure 4:
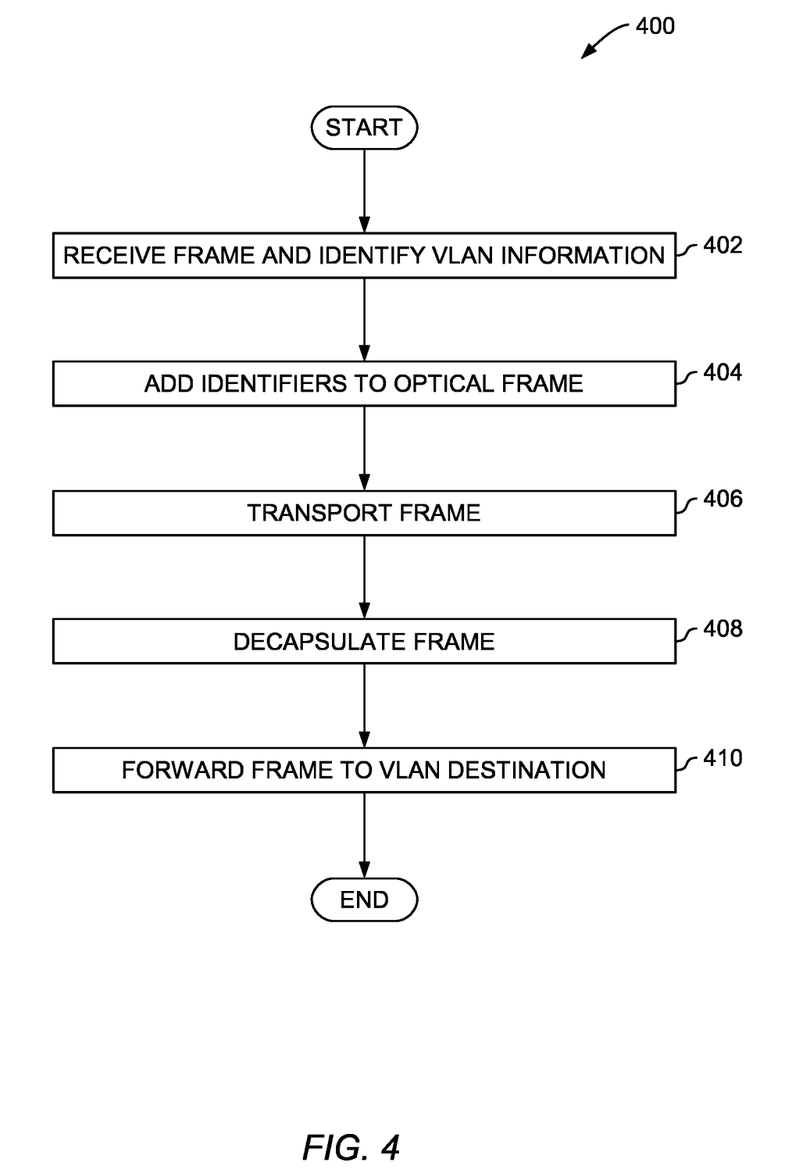
FIG. 4 is a flowchart illustrating VPWS in an optical network, according to one embodiment.

FIG. 4 is a flowchart 400 illustrating VPWS in an optical network, according to one embodiment. In an embodiment, the flowchart 400 corresponds with the block diagram illustrated in FIG. 3. At block 402, a VPWS module (e.g., the VPWS module 212 illustrated in FIG. 2) in a node controller (e.g., the node controller 320 illustrated in FIG. 3) receives a data frame (e.g., an L2 frame) from a CE device (e.g., the CE device 322 illustrated in FIG. 3) and identifies VLAN information for that frame. For example, the data frame can include VLAN and port-index information during transmission from the CE device to the node controller. In an embodiment, destination port information is generally static in a VPWS connection, and so the VLAN identifier and destination port-index can be used to identify a destination (e.g., a destination CE device).

At block 404, the VPWS module adds identifiers for the VLAN to an optical frame. For example, the VPWS module can add a VLAN identifier and a port index to the ODU overhead (e.g., ODUFlex overhead). This is discussed further below with regard to FIG. 5.

At block 406, the optical network (e.g., an OTN) transports the optical frame from the source node controller to a destination node controller (e.g., from the node controller 320 to the node controller 330 illustrated in FIG. 3). In an embodiment, ODUFlex OTN LSP can be used. This is merely an example, and any suitable optical transmission format can be used.

At block 408, a VPWS module in the destination node controller (e.g., the node controller 330 illustrated in FIG. 3) decapsulates the frame and retrieves the VLAN identification information (e.g., the VLAN identifier and port index). At block 410, the VPWS module forwards the frame to the VLAN destination, based on the VLAN identification information.

Figure 5:
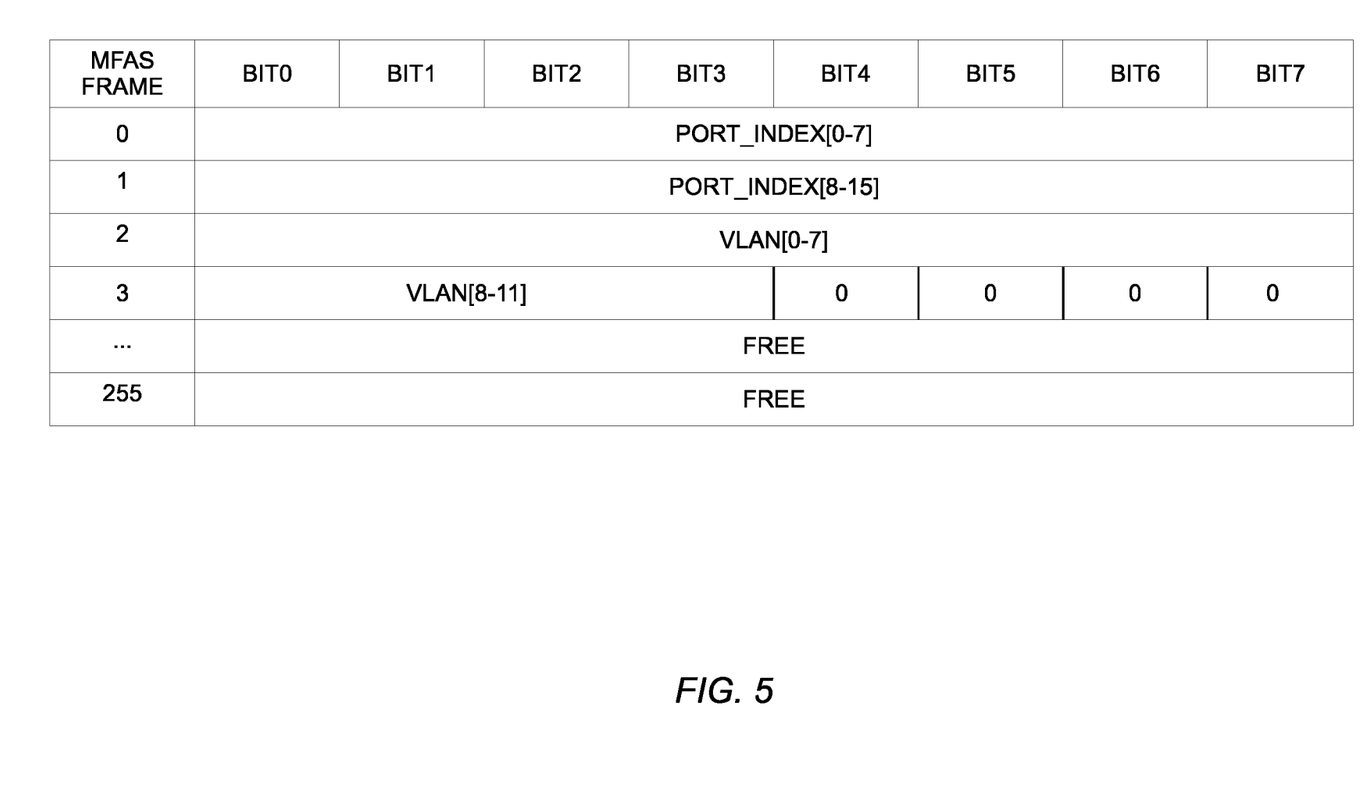
FIG. 5 illustrates a transmission format for VPN traffic steering in an optical network, according to one embodiment.

FIG. 5 illustrates a transmission format for VPN traffic steering in an optical network, according to one embodiment. As discussed above, in an embodiment a suitable module (e.g., VPWS module 212 illustrated in FIG. 2) inserts VLAN identifiers in an OTN frame to implement a VPWS connection. In an embodiment, the VPWS module can insert the VLAN identifiers in a reserved (e.g., RES) portion of an ODU overhead. For example, ODUFlex defines a reserved portion of the overhead that may be used for additional features. This reserved portion can be used to include the VLAN identification information (e.g., the VLAN identifier and port-index).

FIG. 5 illustrates a multi-frame alignment signal (MFAS) in which one byte in each frame is used to store the VLAN identification information. For example, the MFAS is a 256 frame sequence, each of which includes one reserve byte. In frame 0 of the MFAS, the first byte (e.g., bits [0-7]) includes the first 8 bits of the port index (e.g., Port_Index[0-7]). In frame 1, the first byte includes the next 8 bits of the port index (e.g., Port_Index[8-15]). In frame 2, the first byte includes the first 8 bits of the VLAN identifier (e.g., VLAN [0-7]). In frame 3, the first byte includes the next 4 bits of the VLAN identifier (e.g., VLAN[8-11]).

In this example, the remaining frames and bytes are left free for other applications. In an embodiment, this allows for a 16 bit port-index value (e.g., 0-65535) and a 12 bit VLAN identifier (e.g., 0-4095). This is merely an example, and any suitable VLAN identifiers and frame encoding can be used.

Figure 6:
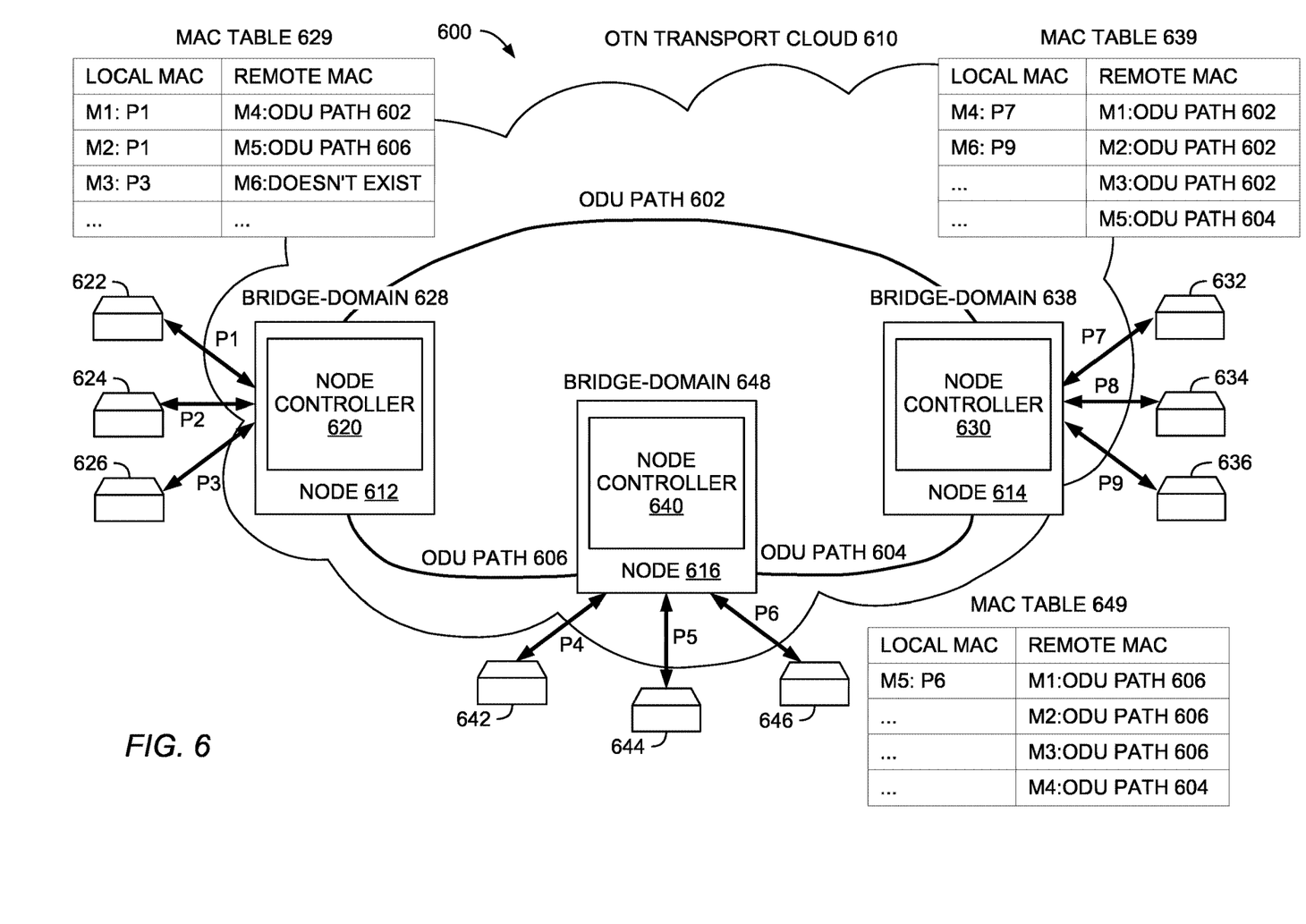
FIG. 6 is a block diagram illustrating VPLS in an optical network, according to one embodiment.

FIG. 6 is a block diagram illustrating VPLS in an optical network 600, according to one embodiment. The optical network 600 includes three nodes 612, 614, and 616, each of which includes a respective node controller 620, 630, and 640. Each node is in communication with three CE devices. The node 612 is in communication with three CE devices 622, 624, and 626. The node 614 is in communication with three CE devices 632, 634, and 636. The node 616 is in communication with three CE devices 642, 644, and 646.

In an embodiment, each CE device is connected to a node using a physical port or L2 sub-interface (e.g., a VLAN enabled interface). For example, the CE device 622 is connected to the node 612 using the port P1. The CE device 624 is connected to the node 612 using the port P2. The CE device 626 is connected to the node 612 using the port P3. The CE device 642 is connected to the node 616 using the port P4. The CE device 644 is connected to the node 616 using the port P5. The CE device 646 is connected to the node 616 using the port P6. The CE device 632 is connected to the node 614 using the port P7. The CE device 634 is connected to the node 614 using the port P8. The CE device 636 is connected to the node 614 using the port P9.

The nodes 612, 614, and 616 are connected by communication paths within the OTN transport cloud 610. For example, the node 612 is connected to the node 614 using ODU path 602 and to the node 614 using the ODU path 606. Node 614 is connected to the node 616 using the ODU Path 604. Each of the ODU paths 602, 604, and 606 can be any suitable optical connection. For example, the ODU paths 602, 604, and 606 can be label switched paths (e.g., ODU-LSPs).

As discussed further below with regard to FIG. 7, in an embodiment, bridge domains 628, 638, and 648 are used in communication between the nodes. For example, the bridge domain 628 can identify the ports and paths for communication between the CE devices 622, 624, and 626 associated with the node 612, and CE devices associated with the remote nodes 614 and 616. The bridge domain 628 could include: {P1, P2, P3, ODU-Path 602, ODU-Path 606}. Similarly, the bridge domain 648 could include: {P4, P5, P6, ODU-Path 606, ODU-Path 604}. The bridge domain 638 could include: {P7, P8, P9, ODU-Path 606, ODU-Path 602}.

In an embodiment, the bridge domains 628, 638, and 648 allow the respective node controllers 620, 630, and 640 to act as switches for traffic between CE devices. Further, in an embodiment, a given node, and node controller, can be associated with multiple bridge domains. In this embodiment, each bridge domain can act independently.

In an embodiment, each of the nodes 612, 614, and 616 is associated with a respective MAC table 629, 639, and 649. This is also discussed further with regard to FIG. 7, below. In an embodiment, each MAC table 629, 639, and 649 correlates a MAC address with a respective port or path. For example, the MAC table 629 includes a local MAC table and a remote MAC table. The local MAC table correlates MAC address M1 with port P1, MAC address M2 with port P1, and MAC address M3 with port P3. The remote MC table correlates MAC address M4 with ODU path 602 and MAC address M5 with ODU path 606. The MAC tables 639 and 649 similarly include both a local MAC table and a remote MAC table.

In an embodiment, the MAC tables 629, 639, and 649 are used to route traffic between nodes 612, 614, and 616. For example, assume the node 612 and the node controller 620 receive a request to transmit data to the MAC address M4. Using the MAC table 629, the node controller 620 can determine that the MAC address M4 is associated with the ODU path 602, and can transmit the data across the ODU path 602 to the node 614. The node controller 630, at the node 614, can then determine that the MAC address M4 is associated with the port P7, and can transmit the data using port P7 to the CE device 632.

Figure 7:
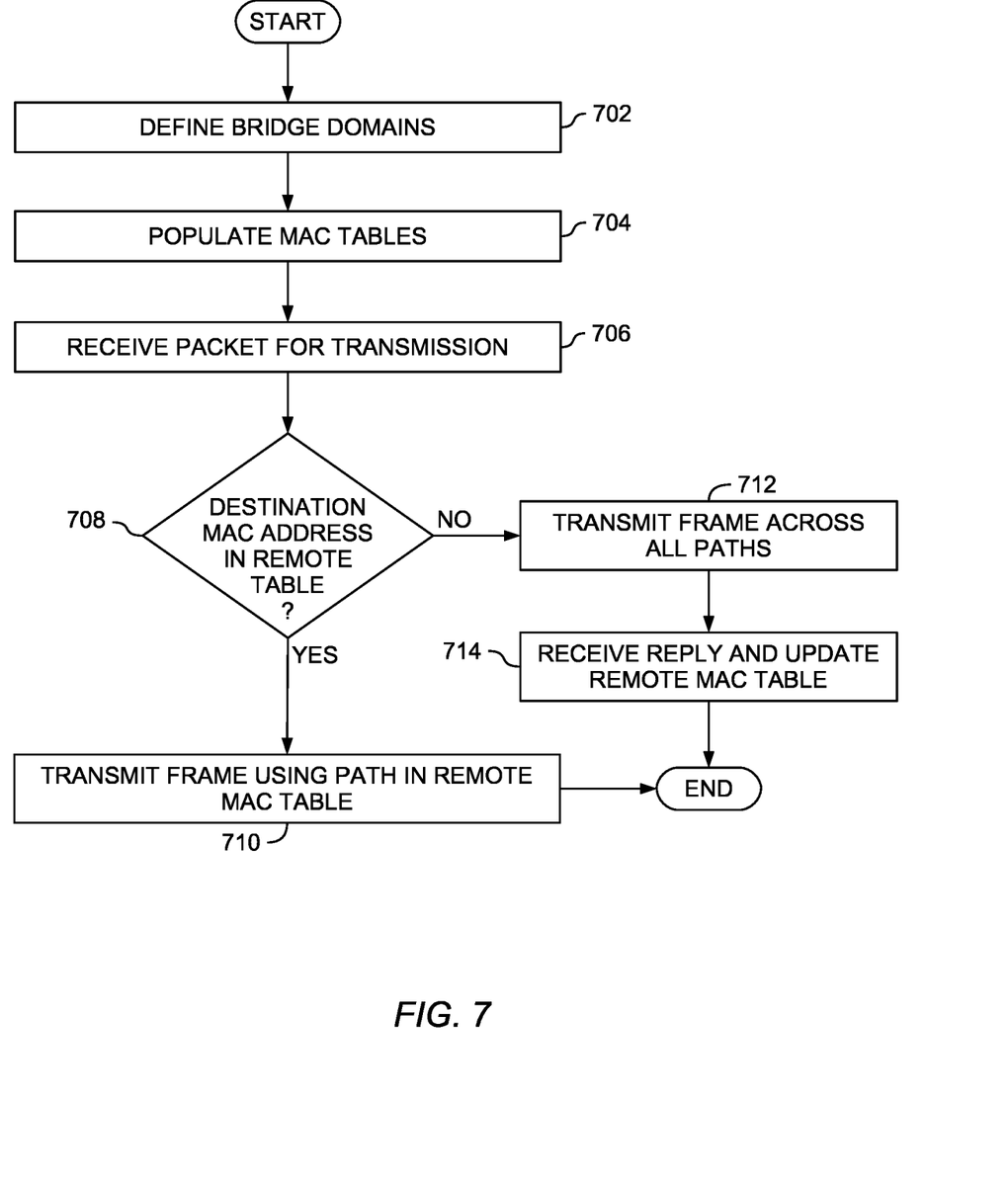
FIG. 7 is a flowchart illustrating VPLS in an optical network, according to one embodiment.

FIG. 7 is a flowchart 700 illustrating VPLS in an optical network, according to one embodiment. At block 702, a VPLS module (e.g., VPLS module 214 illustrated in FIG. 2) defines a bridge domain for a given node. For example, a VPLS module can add each level 2 interface (e.g., port or VLAN interface) associated with the node to the bridge domain. As one example, a VPLS module in the node controller 620 illustrated in FIG. 6 can add the ports P1, P2, and P3 to the bridge domain 628.

The VPLS module can then add each path to the bridge domain. As one example, the VPLS module in the node controller 620 can add the ODU path 602 and the ODU path 604 to the bridge domain 628. This can be done using any suitable technique. In an embodiment, the VPLS module can statically define a generalized multiprotocol label switching (GMPLS) path for each of the node's neighbors (e.g., the neighbor nodes 614 and 616 for the node 612). Alternatively, or in addition, the VPLS module can add neighbor loopback addresses, so that a GMPLS path is dynamically created for each neighbor node.

At block 704, the VPLS module populates MAC tables. In embodiment, this involves local MAC learning to populate a local MAC table and remote MAC learning to populate a remote MAC table. For example, the local MAC table can be populated by identifying a MAC address associated with each locally connected level 2 interface or sub-interface (e.g., a MAC address associated with each port). As one example, the local MAC table in the MAC table 629 is populated by identifying MAC address M1 associated with port P1, MAC address M2 associated with port P1, and MAC address M3 associated with port P3.

In an embodiment, the VPLS module performs remote MAC learning based on transmission received over the paths. For example, a packet from an incoming path can be decapsulated by a node controller, and a remote MAC table at the node controller can be populated based on the source MAC address in the packet. As one example, assume the node controller 620, illustrated in FIG. 6, receives a packet from ODU path 602. The node controller 620 can decapsulate the packet and identify a source MAC address M4. The node controller 620 can then populate the remote MAC table in the MAC table 629 with an entry correlating the MAC address M4 with the ODU path 602. The node controller 620 can then accurately route packets to the MAC address M4 by transmitting the packets across the ODU path 602.

At block 706, the VPLS module receives a packet for transmission to a destination MAC address. At block 708, the VPLS module determines whether the destination MAC address is included in the remote MAC table. If the destination MAC address is included in the remote MAC table, the flow proceeds to block 710. At block 710, the VPLS module transmits a frame with the packet data across the path identified in the remote MAC table.

In an embodiment, however, a remote MAC table at a given node may not be populated prior to transmitting a packet, or may not include an entry corresponding to a destination MAC address. In this circumstance, the remote MAC table can be populated during transmission of the packet. Returning to block 708, if the VPLS module determines that the destination MAC address is not included in the remote MAC table, the flow proceeds to block 712.

At block 712, the VPLS module transmits a frame with the packet data across all available paths. For example, a VPLS module in the node controller 620, illustrated in FIG. 6, could transmit a frame across both the ODU path 602 and the ODU path 604. Each node in each path then receives the frame. If a node controller at the node determines that the frame is not intended for an address associate with that node, the node controller discards the frame. If a node controller at the node determines that the frame is intended for an address associated with that node, the node controller forwards the frame to the destination MAC address, updates its own remote MAC table (as appropriate) and transmits a reply back to the source node.

At block 714, the VPLS receives this reply and updates its remote MAC table. For example, the VPLS module can decapsulate the frame and update its remote MAC table based on the source MAC address. Further transmissions to that MAC address will then be transmitted only on the path associated with the MAC address in the remote MAC table.

For example, returning to FIG. 6, assume the node controller 620 receives a packet intended for destination MAC address M4. Also assume the MAC table 629 does not include an entry in its remote MAC table correlating the MAC address M4 with an ODU path. The node controller 620 transmits a frame across both the ODU path 602 and the ODU path 606 with the packet data.

The node controller 640, at the node 616, discards this frame because the MAC table 649 does not include an entry in its local MAC table for the MAC address M4.

The node controller 630, at the node 616, uses its MAC table 639 to determine that MAC address M4 is associated with the port P7, and it forwards the frame data through port P7 (e.g., to the CE device 632). The node controller 630 also sends a reply to the node 612 using the ODU path 602. The node controller 620 receives the reply, decapsulates it to identify the source MAC address, and updates the remote MAC table in the MAC table 629 to correlate the MAC address M4 with the ODU path 602.

Figure 8:
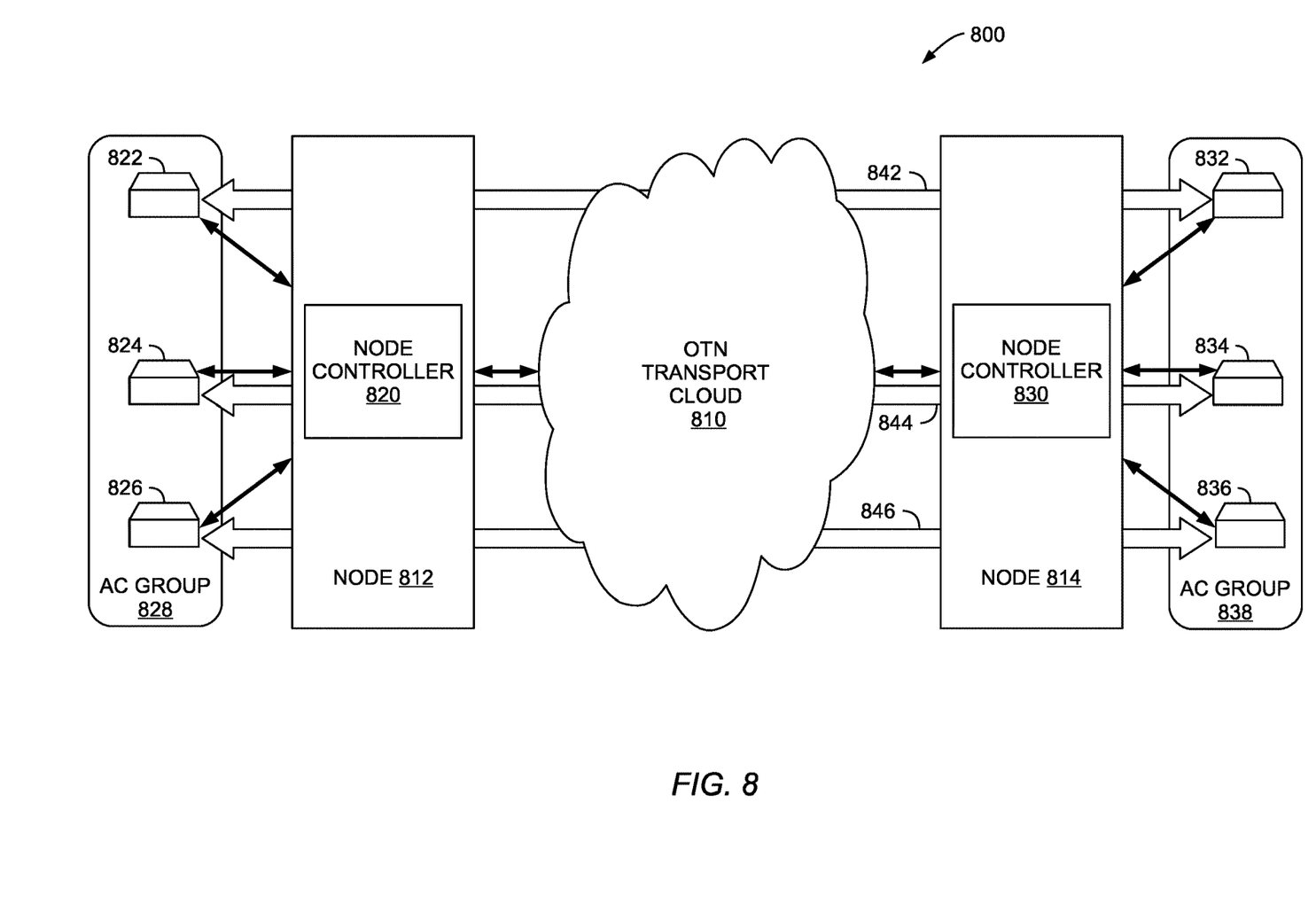
FIG. 8 is a block diagram further illustrating VPWS in an optical network using attachment circuit groups, according to one embodiment.

FIG. 8 is a block diagram further illustrating VPWS in an optical network 800 using AC groups, according to one embodiment. The network 800 includes three CE devices 822, 824, and 826 in communication with a node 812 and a node controller 820. The node 812 communicates with a node 814 using OTN transport cloud 810. The node 814, and node controller 830, are in communication with three additional CE devices 832, 834, and 836.

For example, the node 812 can be located at one geographic location, and can communicate with the node 814 located at a different geographic location using a suitable optical network (e.g., using the OTN transport cloud 810). In an embodiment, the node controllers 820 and 830 implement point-to-point VPWS connections between the CE devices 822, 824, and 826 and the CE devices 832, 834, and 836. For example, the node controllers 820 and 830 can implement a VPWS connection 842 between the CE devices 822 and 832, a VPWS connection 844 between the CE devices 824 and 834, and a VPWS connection 844 between the CE devices 824 and 834.

As discussed further below with regard to FIG. 9, in an embodiment, the node controllers 820 and 830 implement the VPWS connections 842, 844, and 846 using AC groups 828 and 838. For example, each frame transmitted by the node controller 820 can be associated with an AC group and a VLAN interface that is assumed to be unique within the AC group. The node controller 820 can transmit a frame to the CE device 832 by identifying the AC group associated with the CE device 832 (e.g., the AC group 838) and the VLAN interface within that AC group associated with the CE device 832.

Figure 9:
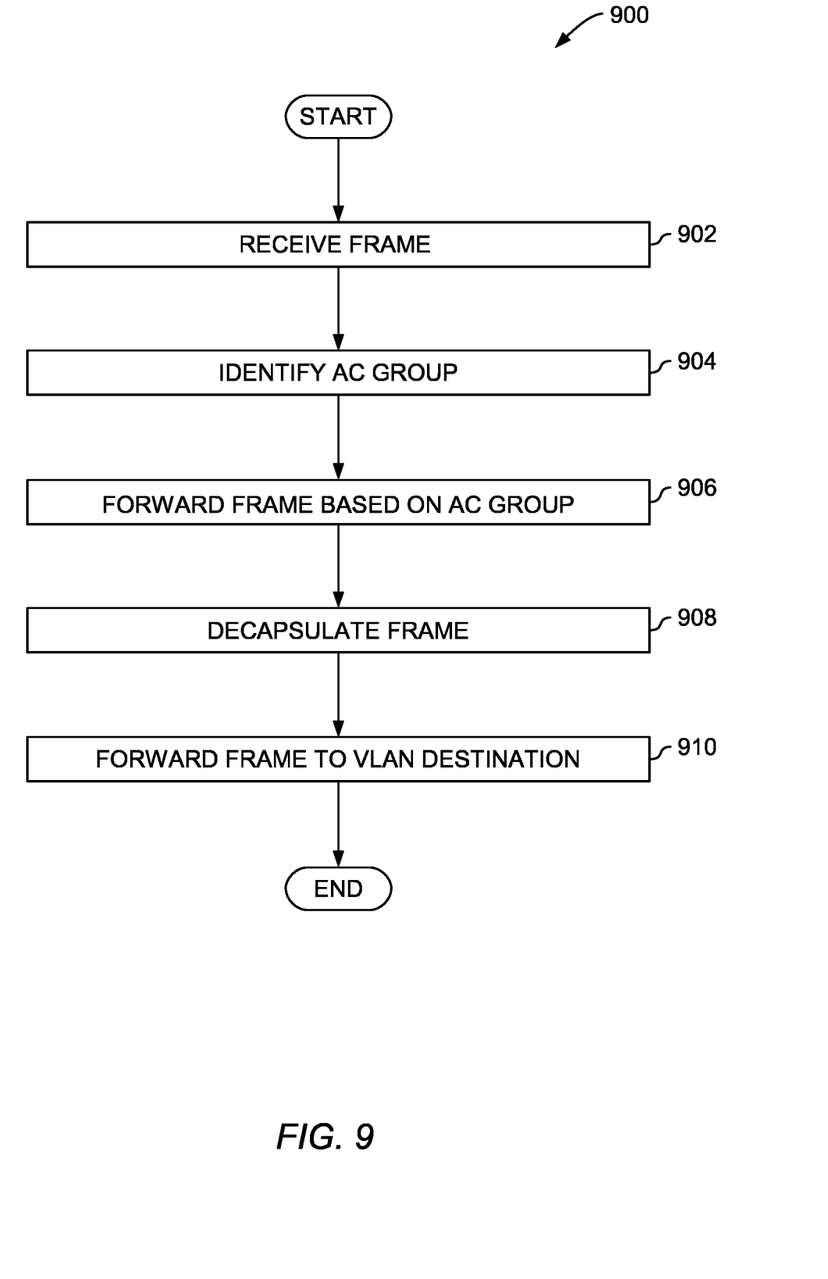
FIG. 9 is a flowchart further illustrating VPWS in an optical network using attachment circuit groups, according to one embodiment.

FIG. 9 is a flowchart 900 further illustrating VPWS in an optical network using AC groups, according to one embodiment. At block 902, a VPWS module (e.g., the VPWS module 212 illustrated in FIG. 2) receives a frame for transmission (e.g., an L2 frame). At block 904, the VPWS module determines that the frame is associated with a particular AC group (e.g., the AC group 838 illustrated in FIG. 8).

At block 906, the VPWS module forwards the frame based on the AC group. In an embodiment, forwarding to this group is configured by the optical network. For example, an OTN transport cloud (e.g., the OTN transport cloud 810 illustrated in FIG. 8) can use ODUFlex OTN LSP to forward the frame to the identified AC group. In an embodiment, the OTN can perform flex switching at each hop during transmission (e.g., using ODUFlex OTN LSP).

At block 908, a VPWS module at a destination node controller decapsulates the frame. At block 910, the VPWS module uses VLAN lookup to identify the destination VLAN interface (e.g., the unique VLAN interface associated with the destination AC group). The VPWS module forwards the frame to the VLAN destination.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, from a source device communicatively coupled to a first node in an optical communication network, client data for transmission over the optical communication network to a destination device communicatively coupled to a second node in the optical communication network; and
   transmitting the client data from the source device to the destination device using a layer 2 (L2) virtual network connection between the source device and the destination device implemented over an optical transport network (OTN) path, based on including an identifier relating to the L2 virtual network connection in an optical frame, comprising:
      transmitting the client data from the first node to the second node over the OTN path through the optical communication network using the optical frame, wherein the second node is configured to receive the optical frame and transmit the client data to the destination device based on the identifier in the optical frame, the transmitting the client data from the first node to the second node over the OTN path comprising:
         determining the OTN path based on a media access control (MAC) address table comprising one or more MAC addresses and one or more corresponding OTN path identifiers,
            wherein the identifier in the optical frame comprises a MAC address and the second node is configured to transmit the client data to the destination device based on a second MAC address table comprising a second one or more MAC addresses and one or more corresponding destination identifiers.

2. The method of claim 1, wherein the L2 virtual network connection comprises a virtual private local area network service (VPLS) connection between the source device and the destination device.

3. The method of claim 2, wherein the one or more corresponding destination identifiers comprise at least one of VLAN interface identifiers or port identifiers.

4. The method of claim 2, further comprising: populating the MAC address table with an entry comprising a MAC address associated with the destination device and an OTN path identifier associated with the OTN path.

5. The method of claim 4, wherein the populating is based on a transmission received at the first node from the second node using the OTN path.

6. A computer program product, comprising:
a non-transitory computer-readable storage medium having computer-readable program code embodied therewith, the computer-readable program code executable by one or more computer processors to perform an operation, the operation comprising:
   receiving, from a source device communicatively coupled to a first node in an optical communication network, client data for transmission over the optical communication network to a destination device communicatively coupled to a second node in the optical communication network; and
   transmitting the client data from the source device to the destination device using a layer 2 (L2) virtual network connection between the source device and the destination device implemented over an optical transport network (OTN) path, based on including an identifier relating to the L2 virtual network connection in an optical frame, comprising:
      transmitting the client data from the first node to the second node over the OTN path through the optical communication network using the optical frame, wherein the second node is configured to receive the optical frame and transmit the client data to the destination device based on the identifier in the optical frame, the transmitting the client data from the first node to the second node over the OTN path comprising:
         determining the OTN path based on a media access control (MAC) address table comprising one or more MAC addresses and one or more corresponding OTN path identifiers,
            wherein the identifier in the optical frame comprises a MAC address and the second node is configured to transmit the client data to the destination device based on a second MAC address table comprising a second one or more MAC addresses and one or more corresponding destination identifiers.

7. The computer program product of claim 6,
wherein the L2 virtual network connection comprises a virtual private local area network service (VPLS) connection between the source device and the destination device,
and wherein the transmitting comprises the determining the OTN path based on the MAC address table comprising the one or more MAC addresses and the one or more corresponding OTN path identifiers.

8. A system, comprising:
a processor; and
a memory storing a program, which, when executed on the processor, performs an operation, the operation comprising:
   receiving, from a source device communicatively coupled to a first node in an optical communication network, client data for transmission over the optical communication network to a destination device communicatively coupled to a second node in the optical communication network; and
   transmitting the client data from the source device to the destination device using a layer 2 (L2) virtual network connection between the source device and the destination device implemented over an optical transport network (OTN) path, based on including an identifier relating to the L2 virtual network connection in an optical frame, comprising:

transmitting the client data from the first node to the second node over the OTN path through the optical communication network using the optical frame, wherein the second node is configured to receive the optical frame and transmit the client data to the destination device based on the identifier in the optical frame, the transmitting the client data from the first node to the second node over the OTN path comprising:

determining the OTN path based on a media access control (MAC) address table comprising one or more MAC addresses and one or more corresponding OTN path identifiers, wherein the identifier in the optical frame comprises a MAC address and the second node is configured to transmit the client data to the destination device based on a second MAC address table comprising a second one or more MAC addresses and one or more corresponding destination identifiers.

9. The system of claim 8, wherein the L2 virtual network connection comprises a virtual private local area network service (VPLS) connection between the source device and the destination device, and wherein the transmitting comprises the determining the OTN path based on the MAC address table comprising the one or more MAC addresses and the one or more corresponding OTN path identifiers.

* * * * *